Figure 1:
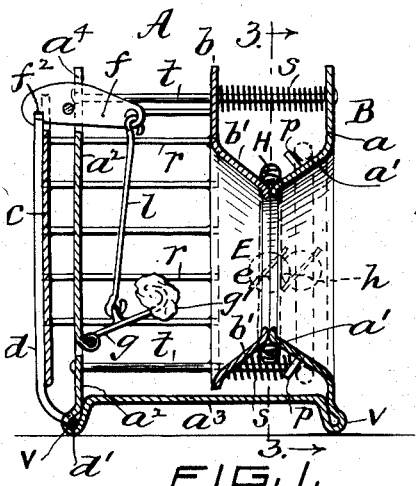

No. 883,611. PATENTED MAR. 31, 1908.
J. BARAD & E. E. MARKOFF.
DEVICE EMPLOYED FOR EXTERMINATING RATS, MICE, AND OTHER ANIMALS.
APPLICATION FILED DEC. 16, 1907.

WITNESSES.
C. J. Hannigan.
Calvin H. Brown.

INVENTORS.
Joseph Barad.
Edward E. Markoff.
By Geo. H. Remington.
Attorney.

UNITED STATES PATENT OFFICE.

JOSEPH BARAD AND EDWARD E. MARKOFF, OF PROVIDENCE, RHODE ISLAND.

DEVICE EMPLOYED FOR EXTERMINATING RATS, MICE, AND OTHER ANIMALS.

No. 883,611.　　　　　Specification of Letters Patent.　　Patented March 31, 1908.

Application filed December 16, 1907. Serial No. 406,810.

*To all whom it may concern:*

Be it known that we, JOSEPH BARAD, a citizen of the United States of America, and EDWARD E. MARKOFF, a subject of the Czar of Russia, and residents of the city and county of Providence and State of Rhode Island, have jointly invented certain new and useful Improvements in Devices Employed for Exterminating Rats, Mice, and other Animals, of which the following is a specification.

Our invention relates to improved means for exterminating rats, mice, &c., and it consists essentially of a device having a normally closed laterally separable annular frame, an endless flexible resilient band or collar supported by and encircling said annular part of the frame, and spring-resisted tripping means operatively connected with a member of the frame, all constructed and arranged whereby an animal, say a rat, upon introducing its head through the frame opening and seizing the lure or bait attached to said tripping means automatically releases the latter, which action at the same instant also releases and separates the said frame member and frees the expanded band, which latter then immediately contracts around the animal's neck before he can retreat from the device or apparatus. The thus bedecked animal is not caught or confined in any manner whatever but is free to return to its hole and colony.

We are of course well aware that various kinds and types of traps have been devised and employed for capturing animals of the rodent and other species; some traps being so constructed that the captives are kept alive uninjured, and other traps are designed to kill the animals outright. We disclaim all such former class of articles or apparatus.

While our invention might be termed an animal trap it is in fact not a trap at all, because the animal is neither caught, confined nor killed in or by it, and is free to enter its head and neck into the device and to readily withdraw it therefrom without restraint or injury.

It is a well-known fact that certain animals, as rats, mice and analogous animals of the rodent class are naturally excessively sly and distrustful, even to members of their own family, although at times working together in harmony, as for example, in carrying off and storing food and articles having considerable weight and bulkiness. It is also known that the sound or tinkling of a bell is as a rule very terrifying to animals of the species named and that if pursued by such sounds they will immediately vacate their haunts and homes, never to return.

The object we have in view is to take advantage of the peculiar characteristic or instinct inherent say in the animal class just referred to, to that end we have invented and produced an extremely simple and inexpensive automatic device or mechanism capable when properly positioned and set of enticing an animal, as a rat, to it so that when he nibbles or touches the bait the previously set tripping means and the annular spring band or collar, having one or more small bells attached to it, will be released simultaneously, the thus freed bell-carrying band at the same instant contracting around the rat's neck. The "bell-rat" as it may be termed, then in seeking its burrow or colony announces his coming by the sounds emitted by the bells, thereby frightening the other rats and causing them to flee, thus practically exterminating them in a sure and economical manner. It may be added that the spring-band or collar is not liable to become accidentally lost or slip from the rat's neck because the adjacent hairs soon become interwoven with the convolutions of the spring to more firmly hold it in place.

Figure 2:
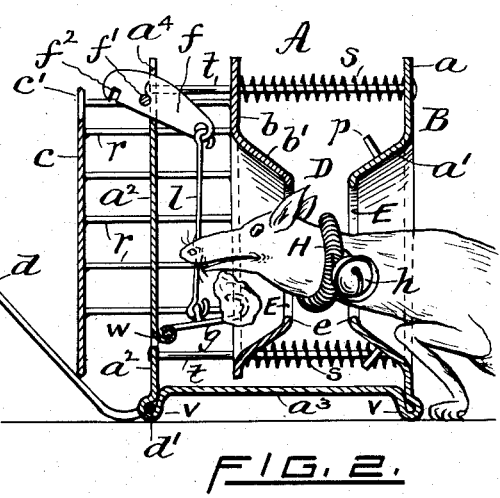
Figure 3:
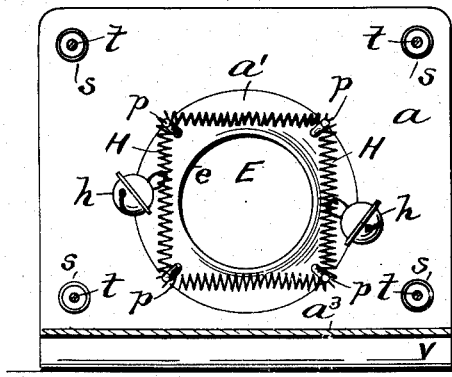
Figure 4:
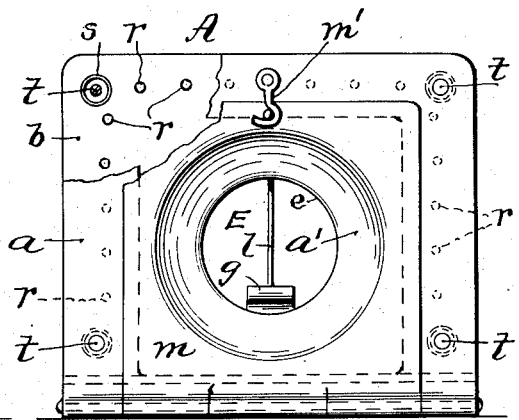
Figure 5:
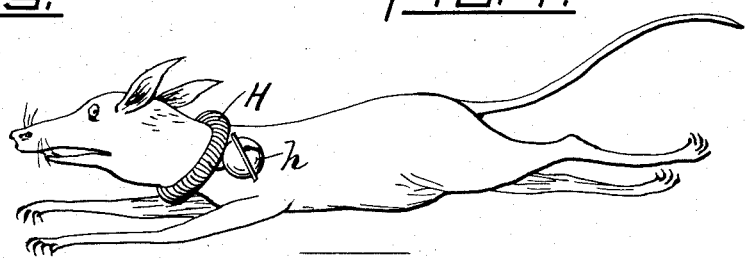

In the accompanying sheet of drawings, Figure 1 is a longitudinal sectional view taken through the center of an animal exterminating apparatus embodying our invention, the device being represented in the normally "set" position, as in use. Fig. 2 is a similar sectional view showing the tripping mechanism sprung or liberated, as in normal action. Fig. 3 is a transverse section taken on line 3, 3 of Fig. 1. In this figure the spring-band or collar is represented as being temporarily supported on fixed pins preliminary to setting the tripping means and before the band is taken from the pins and allowed to seat itself in the normal position indicated in Fig. 1. Fig. 4 represents a front end view of the device, showing a modified construction of the front frame part, and Fig. 5 indicates a fleeing animal having the spring band encircling its neck.

The following is a more detailed description of our invention, the device as a whole being indicated by the character A.

The main frame portion B consists of the two oppositely disposed alining front and back vertically extending laterally separable members, $a$ and $b$, respectively; the same being made of suitable sheet-metal and having a substantially rectangular form. See Figs. 3 and 4. The stock of the said front frame member $a$ extends horizontally at the bottom to form a base part $a^3$ which terminates in the upwardly extending rear plate $a^2$. If desired the stock may be bent to form feet or supports $v$, all being integral. The center portion of the front $a$ is pressed rearwardly by suitable tools to produce the beveled circular flange $a^1$ terminating in the comparatively large unobstructed central opening E. Pins $p$ are fixed at intervals around the exterior of the flange for temporarily supporting the spring-band or collar H, soon to be described. The said parts $a$ and $a^2$ are maintained in proper relation or distance apart by means of the horizontal tie-rods $t$ secured to them, as clearly shown. The said back member $b$ of the main frame is made of sheet-metal and also provided with a beveled circular flange $b^1$ (the latter, however, extending toward the front) and a circular central opening E, the latter registering or being in alinement with that of the part $a$. The member $b$ is located between parts $a$ and $a^2$ and is slidably mounted on the rods $t$; helically-wound springs $s$ carried by the latter and bearing against the adjacent surfaces of the frame members serve to automatically keep the latter separated (as in Fig. 2) except when in the locked or set position, indicated in Fig. 1.

An outer back plate $c$ is movable with the member $b$ by means of a number of interposed horizontal wires $r$ rigidly secured thereto. These wires are adapted to slide freely through corresponding holes formed therefor in the stationary plate $a^2$; they also form a guard for protecting the bait $g^1$.

The bait or lure-hook $g$ of the tripping mechanism is pivoted at $w$ to the lower part of plate $a^2$ and is connected by a link $l$ jointed to the front end of a thin lever $f$, in turn pivoted on a fixed pin $f^1$ and arranged to swing in a slot $a^4$ formed centrally in the upper part of the plate $a^2$. The rear end of the lever has a notch $f^2$ cut in its underside; said end part, when the device is locked or positioned for use extends through a slotted opening $c^1$ formed in the top edge of plate $c$. A bar or latch $d$ is suitably mounted or pivoted at $d^1$ and extends at the rear of the last-named plate, the arrangement being such that upon swinging the bar upwardly it contacts with the plate and forces the spring-pressed frame member $b$ ahead until its forward edge engages that of the stationary member $a$; the free end of said lever $f$ then projecting rearwardly through the slot $c^1$ as before stated so as to permit the corresponding end of the latch $d$ to be moved sidewise into the notch $f^2$, the several parts then appearing substantially as represented in Fig. 1.

It may be stated that the size of the central opening E is made large enough to permit the animal to freely introduce its head and neck therethrough and reach the bait on the hook $g$, and also to readily allow it to withdraw after seizing the bait.

The other part of our invention resides in the employment of an endless resilient or elastic band or collar H. We prefer to use for the purpose a spring made of suitable fine wire wound in a helical manner so as to be capable of expansion and contraction in a radial direction and circumferentially. If desired the collar may have one or more small bells $h$ attached to it. As a matter of convenience in setting the device the collar may be first temporarily mounted on the flange $a^1$ of the front frame member $a$, the pins $q$ retaining it in position as indicated by full lines in Fig. 3 and by dotted lines in Fig. 1. After the apparatus has been fully adjusted and set, that is when the two edges $e$ are brought together, the collar upon being detached from the pins $p$ slides downwardly and conforms to the bottom of the V-shaped or self-positioning beveled sides $a^1$ $b^1$, as shown by full lines in said Fig. 1.

In order to facilitate the placing of the collar upon the pins $p$ the corresponding part of the front $a$ may be cut away and a swinging member $m$ substituted therefor, a hook or catch $m^1$ or other suitable means being employed for securing it in the vertical or closed position, as clearly shown in Fig. 4. The last-named figure is partly broken away to show some of the rear parts more clearly.

From the foregoing description and in connection with the drawings it is clearly apparent that in case the animal introduces its head and neck into the central opening E of the properly baited and set apparatus A, represented in Fig. 1, the act of lightly touching the bait by the animal will operate to release the tripping mechanism, at which instant the springs $s$ will force the frame part $b$ rearwardly, thereby separating the joint or edges $e$ and producing the comparatively wide transverse opening D (Fig. 2), the expanded collar H at the same time passing freely downwardly therethrough and automatically contracting itself around the animal's neck before he can retreat.

We do not herewith limit the form and arrangement of the members of our apparatus to the particular construction of the various parts shown, as it is obvious that they may be varied without departing from the spirit and scope of the invention, the essential feature of which is a structure provided with a supported resilient band or collar adapted to be freed therefrom so as to automatically contract and at the same time encircle the neck of the animal by the act of the animal itself.

We claim as our invention and desire to secure by United States Letters-Patent:—

1. A device of the character described having a transversely separable normally closed spring-pressed frame provided with a longitudinally disposed opening arranged to freely receive therein the head and neck of an animal, an elastic collar exteriorly surrounded and being operatively supported by the walls of said opening, and tripping means, including a bait-carrying member, connected with the movable part of said frame adapted to be released by an animal.

2. In a device of the character described, the combination of a frame divided transversely into two parts, one of which is longitudinally movable, a central opening extending longitudinally through both said parts of the frame, holding means for normally maintaining said movable part in releasable contact with its fellow, an elastic collar supported in an expanded condition around the walls of the frame at said contact point, and a member operatively connected with and arranged to automatically release said holding means by the action of an animal in moving said member, substantially as hereinbefore described and for the purpose set forth.

3. In a device of the character described, the combination with a stationary front frame member having a central entrance opening, a spring-pressed endwise slidable fellow frame member located at the rear of said front member having a central opening therein registering with the first-named opening, and an endless elastic collar supported in the expanded operative position by the wall surrounding said central opening, of means for temporarily supporting the collar, and a tripping device adapted to be baited arranged when set to maintain the front edge of the opening of the slidable frame part in close proximity to the corresponding part of the other frame member, the said tripping device when sprung permitting the slidable frame to move away from its fellow and form an opening D, thereby releasing the said collar and allowing it to pass freely therethrough, substantially as described.

4. In a device of the character described, the combination of a stationary front frame member, a door hinged thereto having a central opening E extending longitudinally of the device, means carried by the door for temporarily supporting an elastic collar, a spring-pressed slidable rear frame member having a central opening therein normally registering with said door-opening, tripping means adapted to be released by an animal for maintaining the two frame members in the normal operative position, and an expanded elastic collar encircling and being normally supported by the walls surrounding said openings, substantially as described.

JOSEPH BARAD.
EDWARD E. MARKOFF.

Witnesses:
GEO. H. REMINGTON,
HENRY B. STONE.